(12) United States Patent
Perry et al.

(10) Patent No.: US 10,004,980 B2
(45) Date of Patent: Jun. 26, 2018

(54) SYSTEMS AND METHODS TO PROVIDE KINETIC DISASTERS

(71) Applicant: Zynga Inc., San Francisco, CA (US)

(72) Inventors: Michael Perry, Oakland, CA (US); Ross W. Danielson, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 360 days.

(21) Appl. No.: 14/674,684

(22) Filed: Mar. 31, 2015

(65) Prior Publication Data

US 2015/0273323 A1  Oct. 1, 2015

Related U.S. Application Data

(60) Provisional application No. 61/972,811, filed on Mar. 31, 2014.

(51) Int. Cl.
| | | |
|---|---|---|
| *A63F 13/211* | (2014.01) | |
| *A63F 13/428* | (2014.01) | |
| *A63F 13/335* | (2014.01) | |

(52) U.S. Cl.
CPC .......... *A63F 13/211* (2014.09); *A63F 13/428* (2014.09); *A63F 13/335* (2014.09); *A63F 2300/105* (2013.01); *A63F 2300/6045* (2013.01)

(58) Field of Classification Search
CPC  A63F 13/211; A63F 13/428; A63F 2300/105; A63F 2300/6045
See application file for complete search history.

(56) References Cited

U.S. PATENT DOCUMENTS

| | | | | |
|---|---|---|---|---|
| 8,649,803 | B1* | 2/2014 | Hamill | G06Q 30/0209 |
| | | | | 455/456.3 |
| 8,740,702 | B2* | 6/2014 | Langridge | G06K 9/00355 |
| | | | | 463/36 |
| 9,483,854 | B1* | 11/2016 | Wakeford | G06T 11/60 |
| 2014/0267189 | A1* | 9/2014 | Moll | G06F 3/03545 |
| | | | | 345/179 |

OTHER PUBLICATIONS

Citaxis. Avoidance and You: A Clarification [online]. Apr. 30, 2010 [retrieved Mar. 15, 2017]. Retrieved from the Internet: <URL:http://www.mmo-champion.com/threads/713571-Avoidance-and-You-A-Clarification>.*

* cited by examiner

*Primary Examiner* — David Duffy
(74) *Attorney, Agent, or Firm* — Schwegman Lundberg & Woessner, P.A.

(57) ABSTRACT

A system, a non-transitory machine-readable storage medium storing instructions, and a computer-implemented method to cause simulation of a kinetic disaster is provided. A physical interaction with a client device is detected during gameplay of a multiplayer game that includes a virtual environment. The detected physical interaction is analyzed using a user interaction profile. A kinetic disaster simulator is selected based on the analyzing the physical interaction with the user interaction profile. Simulation of a predefined game action is caused within the virtual environment.

13 Claims, 8 Drawing Sheets

SYSTEMS AND METHODS TO PROVIDE KINETIC DISASTERS

CROSS-REFERENCE TO RELATED APPLICATIONS

This application claims the priority benefit of U.S. Provisional Application No. 61/972,811, filed Mar. 31, 2014, which is incorporated herein by reference in its entirety.

TECHNICAL FIELD

The present disclosure generally relates to games and applications in general and, in particular embodiments, to computer-implemented multiplayer games, such as online social games hosted on a game server. The present disclosure relates to gaming systems. In particular, an example gaming system provides a kinetic disaster mechanic.

BACKGROUND

Traditional game systems allow for a player to control a player character or a game object within a particular game by activating certain inputs, such as buttons on a controller, keyboard, or mouse. In particular, the inputs initiate a game action (e.g., moving an avatar, placing a building, harvesting a crop, and the like). In some cases, the inputs are configured to initiate a game action directly with the game. For example, a given button may be directly mapped to a "jump" game action. In other cases, the inputs may allow a user to traverse a menu (and corresponding sub-menus) where the player eventually selects a listed game action that is desired to be performed.

With the introduction of touch screens on mobile devices, game actions are also activated through player interactions with the touch screen. In traditional game systems that are configured to be compatible touch screens as a form of user input, a game action can be initiated with a tap on the touch screen of the mobile device. For example, a player may harvest a crop by tapping on the area of the touch screen that displays the crop.

DESCRIPTION OF EXAMPLE EMBODIMENTS

Players of an online multiplayer game may access a multiplayer from a client device and interact with the multiplayer game through the client device. For example, the multiplayer game may allow players to initiate a kinetic disaster within the multiplayer game. The players are enabled to initiate the kinetic disaster by performing a physical interaction or manipulation with a form factor of the client device. A game networking system will cause the kinetic disaster to be executed based on detecting the physical interaction performed by the player with the form factor of the client device.

Kinetic disasters may be used by some example embodiments to provide practical applications. For example, where the hosted game operating on the client system is a game involving a visual depiction of a virtual environment (e.g., such as a city), the kinetic disaster may provide an immersive gaming experience in that the physical manipulation of the form factor of the client system is conceptually linked to the game actions being initiated within the game. Shaking a mobile phone to cause an earthquake illustrates the conceptual link between the user interaction and the game action.

Figure 1:
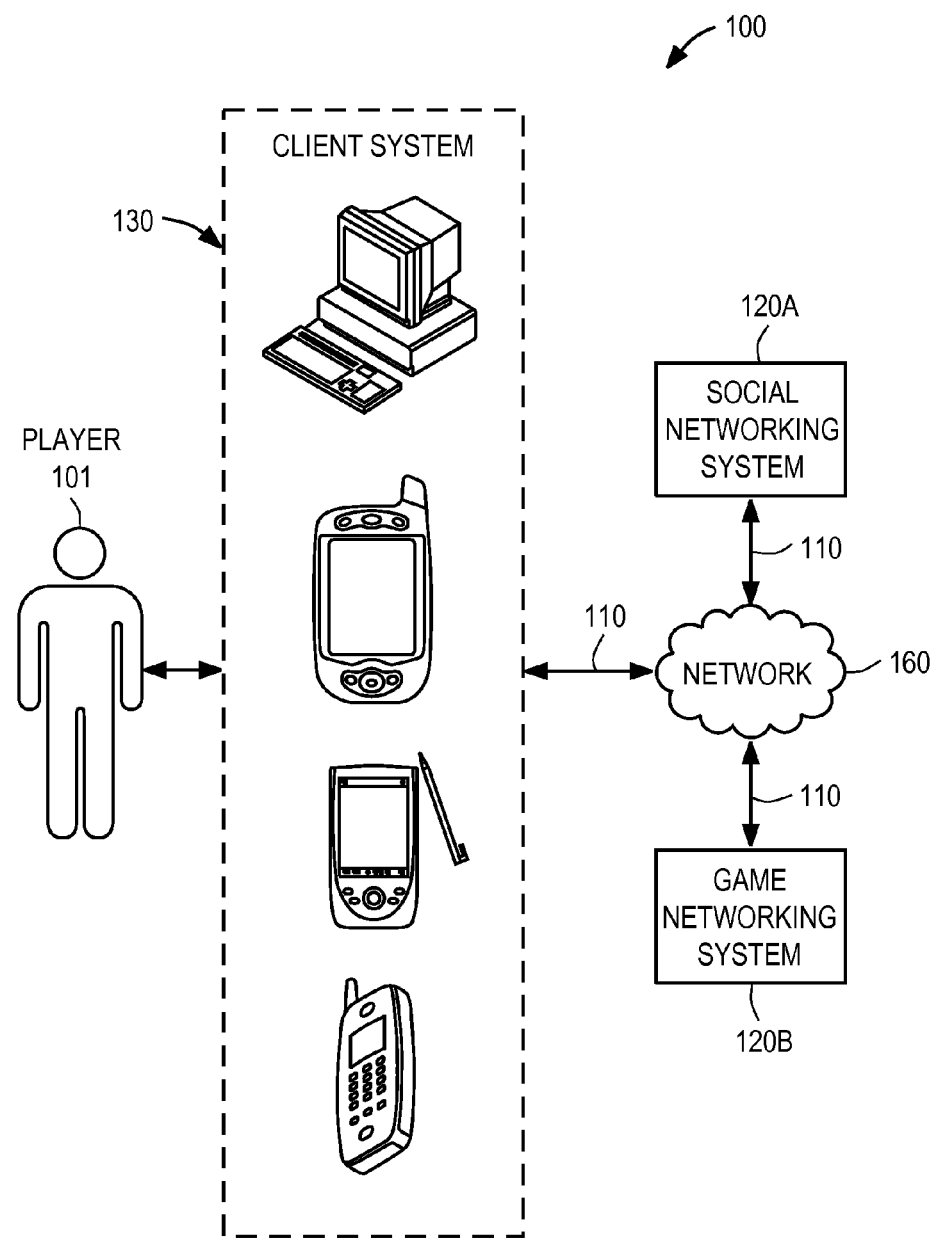
FIG. 1 is a schematic diagram showing an example of a system, according to some example embodiments.

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social network system 120a is a network-addressable computing system that can host one or more social graphs. Social networking system 120a can generate, store, receive, and transmit social networking data. Social network system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accesses by the other components of system 100 either directly or via network 160. Player 101 may use client system 130 to access, send data to, and receive data from social network system 120a and game networking system 120b. Client system 130 can access social networking system 120 or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 120b and no social networking systems 120*a*. As another example and not by way of limitation, system 100 may include a system that comprises both social networking system 120*a* and game networking system 120*b*. Moreover, although FIG. 1 illustrates a particular arrangement of player 101, social network system 120*a*, game networking system 120*b*, client system 130, and network 160, this disclosure contemplates any suitable arrangement of player 101, social network system 120*a*, game networking system 120*b*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social network system 120*a*, game networking system 120*b*, client system 130, and network 160, this disclosure contemplates any suitable connections between player 101, social network system 120*a*, game networking system 120*b*, client system 130, and network 160. As an example and not by way of limitation, in particular embodiments, client system 130 may have a direct connection to social network system 120*a* or game networking system 120*b*, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120*b*, which can be accessed using any suitable connection with a suitable client system 130. A player may have a game account on game networking system 120*b*, wherein the game account can contain a variety of information associated with the player (e.g., the player's personal information, financial information, purchase history, player character state, game state). In some embodiments, a player may play multiple games on game networking system 120*b*, which may maintain a single game account for the player with respect to all the games, or multiple individual game accounts for each game with respect to the player. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120*a*, or game networking system 120*b*). As an example and not by way of limitation, client system 130 can download client components of an online game, which are executed locally, while a remote game server, such as game networking system 120*b*, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120*b*.

Game Systems, Social Networks, and Social Graphs

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
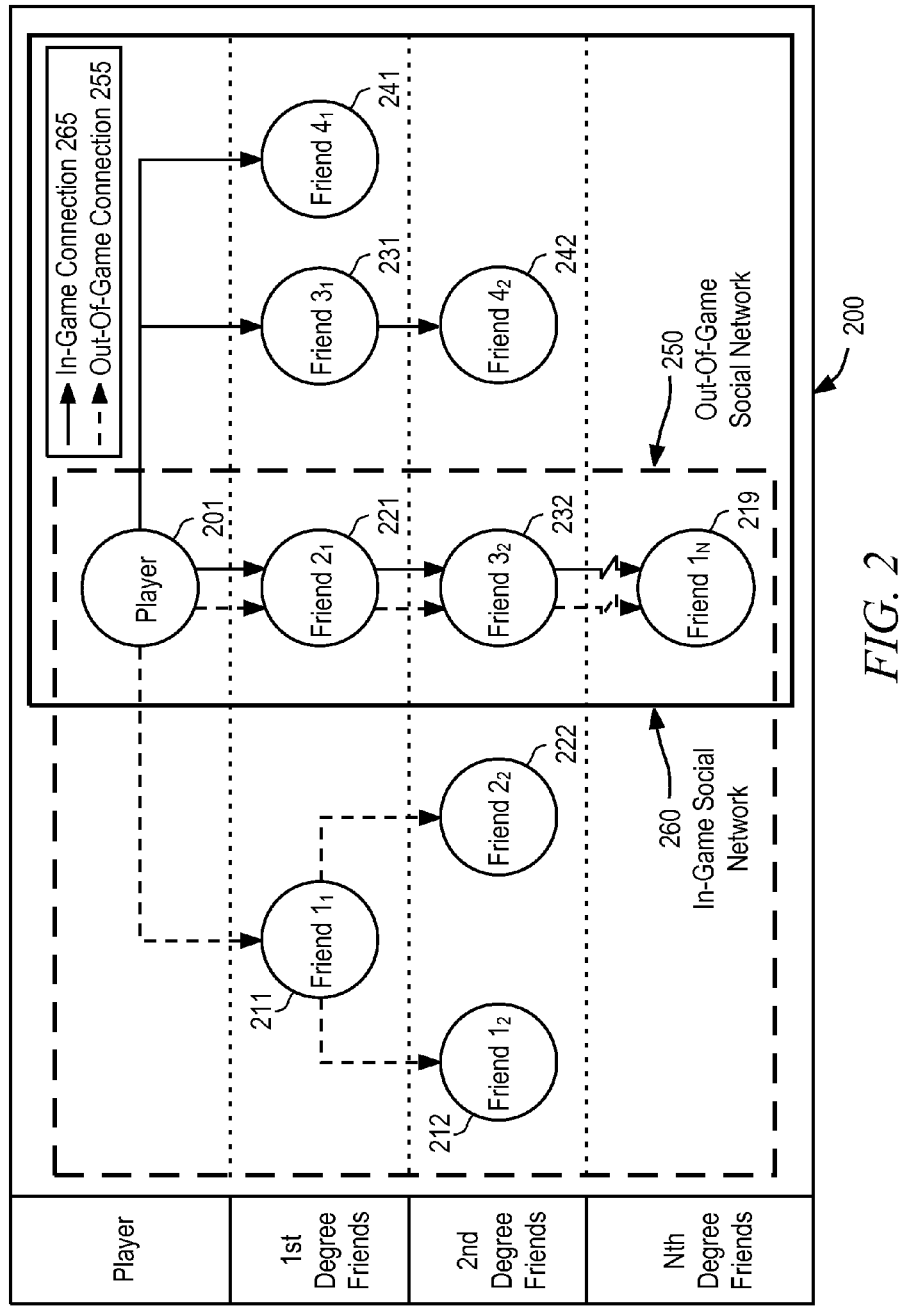
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other).

Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Kinetic Disasters

This section describes various aspects of a kinetic disaster, as implemented by the game networking system 120b. It is to be appreciated that the example embodiments described herein are provided merely for illustration and clarity of description. Consequently, the embodiments described here should not be interpreted as limiting the scope of other example embodiments that are consistent with this disclosure.

In an example embodiment, a player 101, using the client system 130, has access to a multiplayer game hosted by the game networking system 120b over the network 160. In some instances, the multiplayer game allows the player to initiate a kinetic disaster. Further, the kinetic disaster is triggered by the player 101 performing a physical interaction with the client device (e.g., client system 130). As further explained below, the physical interaction with the client device includes the player manipulating or performing an action with a form factor of the client device as opposed to traditional forms of user input (e.g., pressing a button on a keyboard or mouse, tapping on a touch screen).

Figure 3:
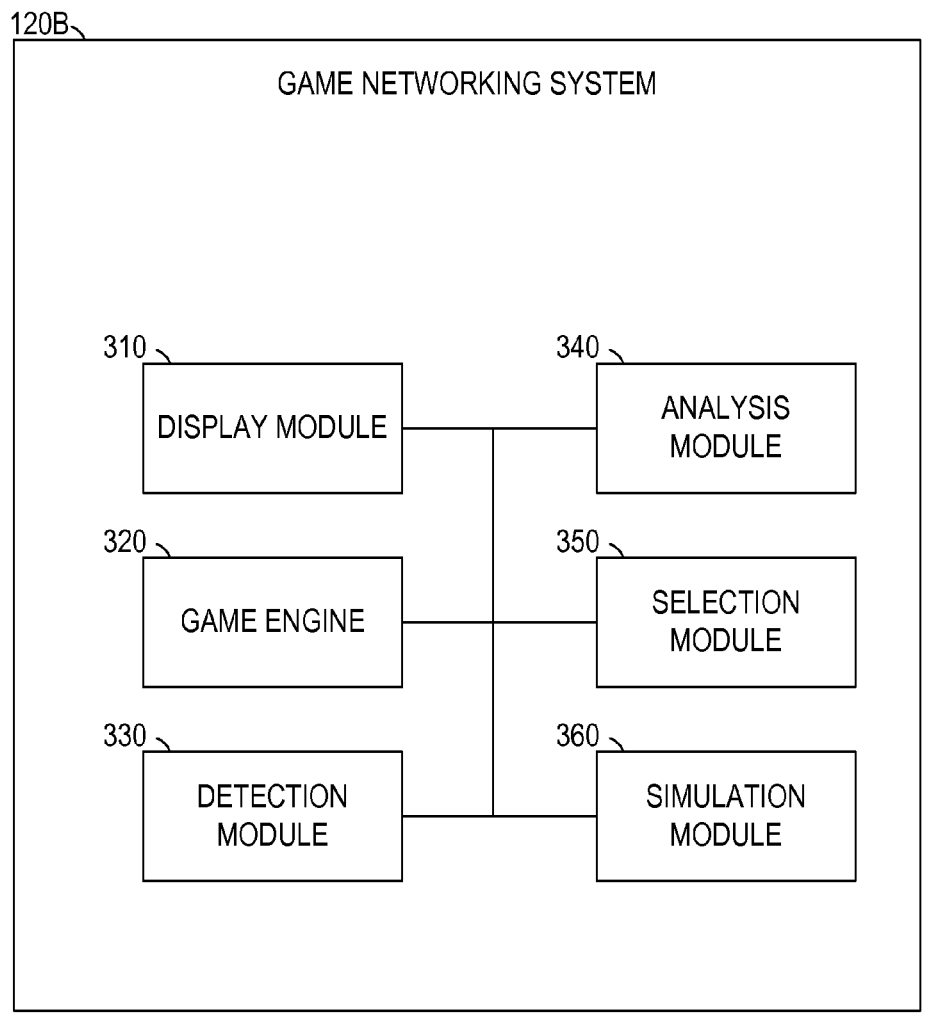
FIG. 3 is a block diagram illustrating components of a game networking system, according to some example embodiments.

FIG. 3 is a block diagram illustrating components of a game networking system, according to some example embodiments. The game networking system 120b may include a display module 310, a game engine 320, a detection module 330, an analysis module 340, a selection module 350, and a simulation module 360.

In various example embodiments, the display module 310 is configured to cause display of various aspects of a multiplayer game. For instance, the display module 310 is configured to generate display data for a game. Display data may refer to data or logic that is used to generate the visual display of a game. In some embodiments, the display data specifies a game environment that includes one or more game objects to be displayed. Further, the display data may specify the location or coordinates of the game objects and any visual effects associated with the game objects.

In various example embodiments, the game engine 320 is a computer-implemented module configured to process game logic and game data that express the game rules and logic of a game. For example, the game engine 320 is configured to execute or simulate a game action on a game object, which may in turn involve updating the state of the game object or any other affected part of the game.

In various example embodiments, the detection module 330 is configured to detect a physical interaction with a client device during gameplay of a multiplayer game that includes a virtual environment. The virtual environment of the multiplayer game is a game environment where the multiplayer game is being played. Moreover, inputs from the client device can cause an event or an outcome within the virtual environment of the multiplayer game. In some instances, the virtual environment also includes one or more game objects of the multiplayer game. For example, the multiplayer game may be a city management game. Accordingly, the virtual environment for the city management game is a city that includes one or more or buildings of the city management game. The player operating the client device is able to execute game data with the game networking system 120b in order to initiate and cause an outcome within the virtual environment of the multiplayer game.

In some instances, the user performs a physical interaction with the client device in order to cause the outcome within the virtual environment of the multiplayer game. Moreover, the physical interaction is associated with a simulated kinetic disaster within the multiplayer game. For example, the user may shake the client device back and forth which may simulate the occurrence of an earthquake within the multiplayer game. Other physical interactions include blowing on a screen of the client device or clapping within the proximity to the client device. The detection module 330 is configured to detect these physical interactions performed by the user during the gameplay of the multiplayer game.

In some instances, physical interactions are sent from the client device over to the game networking system 120b as physical interaction data. For example, if the user shakes the device back and forth, the corresponding physical interaction data may indicate the velocity at which the client device is being moved or a position of the client device during the shaking. As another example, if the user claps, the corresponding physical interaction data may be sound clip that captures a sound of the clapping. Therefore, the detection module 330, in detecting the physical interaction, is further to receive the physical interaction data pertaining to the physical interaction performed by the user.

In some instances, the physical interaction data is generated by the client device. Also, the client device comes equipped with sensors that are embodied on the client device. The sensors embodied on the client device are used to facilitate the generation of the physical interaction data. For example, an accelerometer may be used to track the velocity and speed of the client device.

In various example embodiments, the analysis module 340 is configured to analyze the physical interaction using a user interaction profile. The user interaction profile indicates a set of known user interactions that may be performed by the user during gameplay of the multiplayer game. In some instances, the user interaction profile is data or logic that characterizes whether one or more user inputs qualify as a type of user interaction. In other words, the user interaction profile lists criteria that are used to evaluate whether the physical interaction performed by the user qualifies as a user interaction recognized by the user interaction profile. In this regard, the analysis module 340 is further to map the physical interaction data to one of the recognized user interactions from the user interaction profile. This enables the game networking system 120b to identify which interactions performed by the user meet the criteria to qualify the interaction as a user interaction in the user interaction profile. For example, the analysis module 340 is further to determine that the velocity at which the client device is being moved by the user qualifies as a shaking user interaction of the client device recognized by the user interaction profile. As another example, the analysis module 340 is further to determine that the sound of the clap is loud enough to qualify as a clap user interaction recognized by the user interaction profile.

In various example embodiments, the selection module 350 is configured to select a kinetic disaster simulator based on the analyzing the physical interaction with the user interaction profile. Each of the recognized user interactions from the user interaction profile corresponds with a respective kinetic disaster simulator. For example, a shaking user interaction is mapped to an earthquake simulator. Therefore, the selection module 350 is further to select the kinetic disaster simulator corresponding to the user interaction recognized by the user interaction profile.

In various example embodiments, the analysis module 340 is further configured to determine a degree of the physical interaction with the client device. In other words, for a physical interaction performed by the user with the client device, the analysis module 340 determines the degree at which the user performed the physical interaction. This may include duration of the physical interaction. This may also include an amount of the physical interaction. Accordingly, a corresponding kinetic disaster simulator will also be of varying degrees. For example, if the user shakes the client device less than 3 seconds, this may correspond to a first degree of the earthquake simulator. Alternatively, if the user shakes the client device for greater than 3 seconds, this may correspond to a second degree of the earthquake simulator.

In various example embodiments, the simulation module 360 is configured to cause simulation of a predefined game action within the virtual environment of the multiplayer game. The predefined game action is part of the kinetic disaster simulator selected by the selection module 350. Also, since the virtual environment also includes the one or more game objects, the simulation module 360 is further to cause simulation of the predefined game action with respect to the one or more game objects within the virtual environment. The predefined game action may include causing a predefined amount of change to game values associated with the game objects within the virtual environment of the multiplayer game. As an example, the game objects may be reduced in health by a predetermined amount. The predefined game action may also include causing a predefined animation to be displayed within the virtual environment. In some instances, the predefined game action is different upon each occurrence of the kinetic disaster.

In other words, the simulation module 360 is further to cause simulation of the predefined game action based on a number of previous instances in which the kinetic disaster simulator is selected by the selection module 350. For example, a first earthquake simulated by the simulation module 360 will be less severe than a second earthquake simulated by the simulation module 360.

In various example embodiments, the display module 310 is configured to cause display of the kinetic disaster on the screen of the client device. This includes causing display of the predefined game action being simulated within the virtual environment of the multiplayer game as well as the one or more game objects within the virtual environment. For instance, display module 310 is to display the amount of change to the game values associated with the game objects within the virtual environment of the multiplayer game. Also, the display module 310 may display a predefined animation within the virtual environment.

Figure 4:
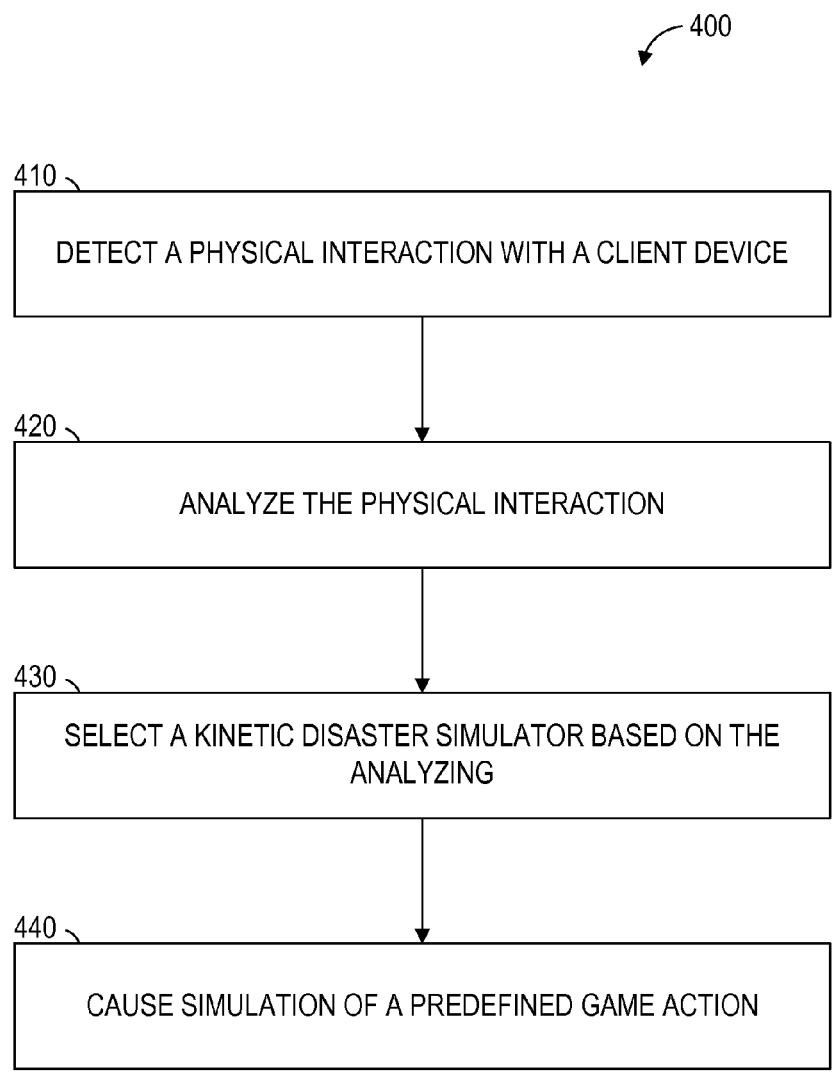
FIGS. 4-6 are flowcharts showing an example method of causing simulation of a predefined game action, according to some example embodiments.

FIG. 4 is a flowchart showing an example method 400 of causing simulation of a predefined game action, according to some example embodiments. As shown, FIG. 4 includes operations 410, 420, 430, and 440.

At operation 410, the detection module 330 detects a physical interaction with a client device. As stated above, the physical interaction is detected during gameplay of a multiplayer game that includes a virtual environment. Moreover, the physical interaction with the client device includes user manipulation or control over the form factor of the client device. In some cases, the physical interaction is performed directly with the form factor of the client device instead of with a game object within the multiplayer game. For example, the user may shake the client device back and forth. As another example, the user may blow on a screen of the client device or clap within a vicinity of the client device. Each of these actions may result in a kinetic disaster that occurs within the multiplayer game.

At operation 420, the analysis module 340 analyzes the physical interaction using a user interaction profile. The user interaction profile indicates a set of known user interactions that may be performed by the user during gameplay of the multiplayer game.

At operation 430, the selection module 350 selects a kinetic disaster simulator based on the analyzing the physical interaction with the user interaction profile. The kinetic disaster simulator includes at least one or more predefined game actions which are applied to the virtual environment. Also, each of the recognized or known user interactions from the user interaction profile corresponds with a kinetic disaster simulator.

At operation 440, the simulation module 360 causes simulation of a predefined game action within the virtual environment. The simulation module 360 causes an animation to be displayed within the virtual environment. In the case of the earthquake simulator, the simulation module 360 causes a shaking animation to appear within the virtual environment.

In some embodiments, the predefined game action includes causing one or more effects to be caused after a predetermined length of time has elapsed from the selection of the kinetic disaster simulator. For example, in the case of the earthquake simulator, an "aftershock" may occur after a predetermined length of time has elapsed after selection of the earthquake simulator. Therefore, the simulation module 360 is further to cause simulation of the predefined game action after the predetermined length of time has elapsed from the selection of the kinetic disaster simulator.

Figure 5:
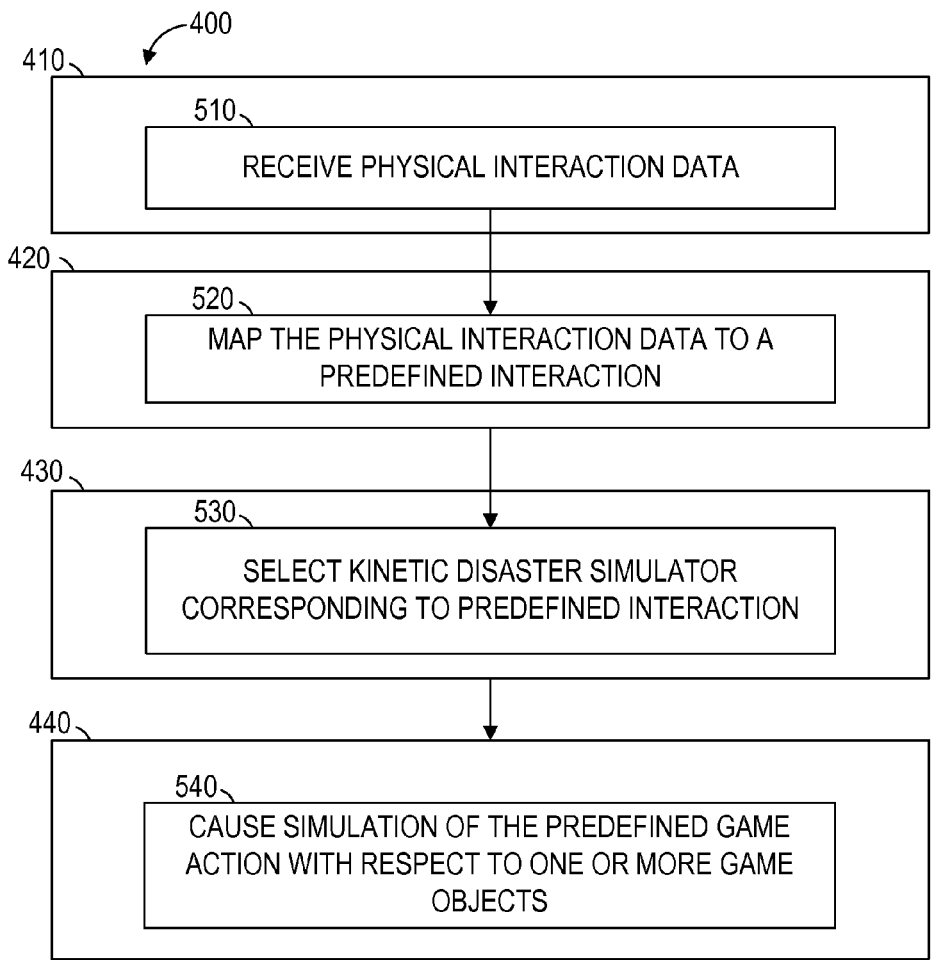

FIG. 5 is a flowchart showing an example method 400 of causing simulation of a predefined game action, according to some example embodiments. As shown in FIG. 5, the method 400 includes operations 510, 520, 530, and 540. Operation 510 may be included in the operation 410. Operation 520 may be included in the operation 420. Operation 530 may be included in the operation 430. Also, operation 540 may be included in the operation 440.

At operation 510, the detection module 330 receives physical interaction data. The physical interaction data indicates the physical interactions performed by the user of the client device. For example, if the user moves the client device back and forth, the physical interaction data may include information regarding the position of the client device. The physical interaction data may also include information regarding a velocity at which the client device is being shaken by the user.

At operation 520, the analysis module 340 maps the physical interaction data to a predefined interaction. As stated above, the user interaction profile indicates a set of known user interactions that may be performed by the user during gameplay of the multiplayer game. Further, the user interaction profile may indicate certain criteria for each of the known user interactions. In some instances, the analysis module 340 compares the physical interaction data with the criteria from the user interaction profile in order to map the physical interaction data to the predefined interaction. For example, the analysis module 340 determines that the velocity at which the user shakes the client device meets the criteria for the shaking interaction.

At operation 530, the selection module 350 selects a kinetic disaster simulator corresponding to the predefined interaction. As stated above, each of the recognized or known user interactions from the user interaction profile corresponds with a kinetic disaster simulator.

At operation 540, the simulation module 360 causes simulation of the predefined game action with respect to one or more game objects within the virtual environment of the multiplayer game. As an example, the simulation module 360 causes damage to affect the health of one or more game objects within the multiplayer game.

Figure 6:
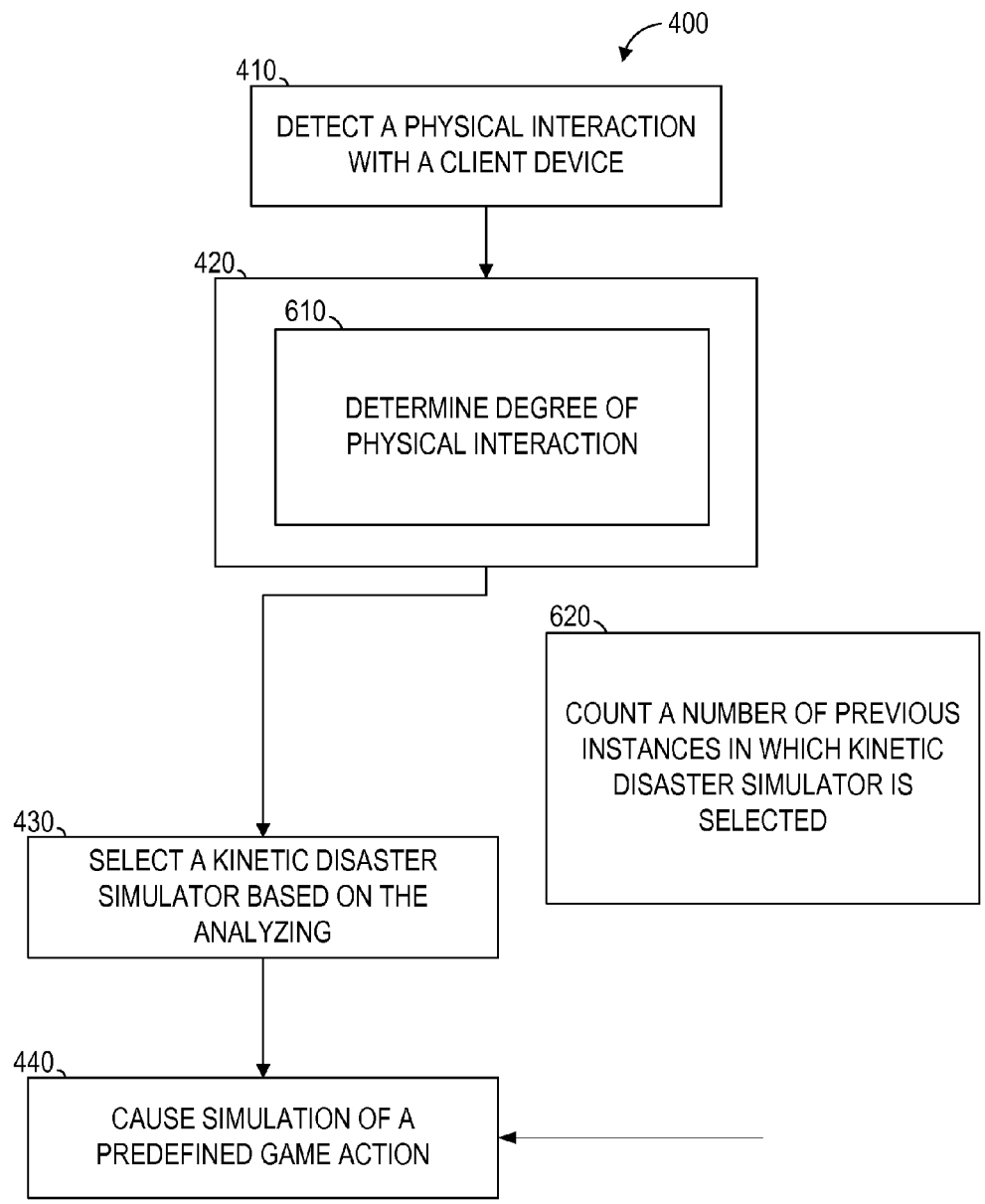

FIG. 6 is a flowchart showing an example method 400 of causing simulation of a predefined game action, according to some example embodiments. As shown in FIG. 6, the method 400 includes operations 610, and 620. In some instances, operation 610 is included in the operation 420. Also, operation 620 is performed prior to operation 440.

At operation 610, the analysis module 340 determines a degree of physical interaction with the client device. The degree of physical interaction includes an amount of the physical interaction with the client device. The degree of physical interaction also includes duration of the physical interaction with the client device. In various embodiments, the analysis module 340 uses the physical interaction data to determine the degree of physical interaction with the client device. Further, the selection module 350, in some embodiments, selects the kinetic disaster simulator based on the determined degree of physical interaction with the client device. As stated above, the corresponding kinetic disaster simulator will also be of varying degrees.

At operation 620, the analysis module 340 counts a number of previous instances in which a kinetic disaster simulator is selected. For example, the earthquake simulator may have been selected twice during gameplay of the multiplayer game. Accordingly, the simulation module 360 is further to cause simulation of the predefined game action based on the number of previous instances in which the kinetic disaster simulator is selected. For example, as the number of times the earthquake simulator gets selected increases, the simulated predefined game action may be less severe. For example, the damage caused by the earthquake simulator is reduced for every occurrence of the earthquake simulator.

Data Flow

Figure 7:
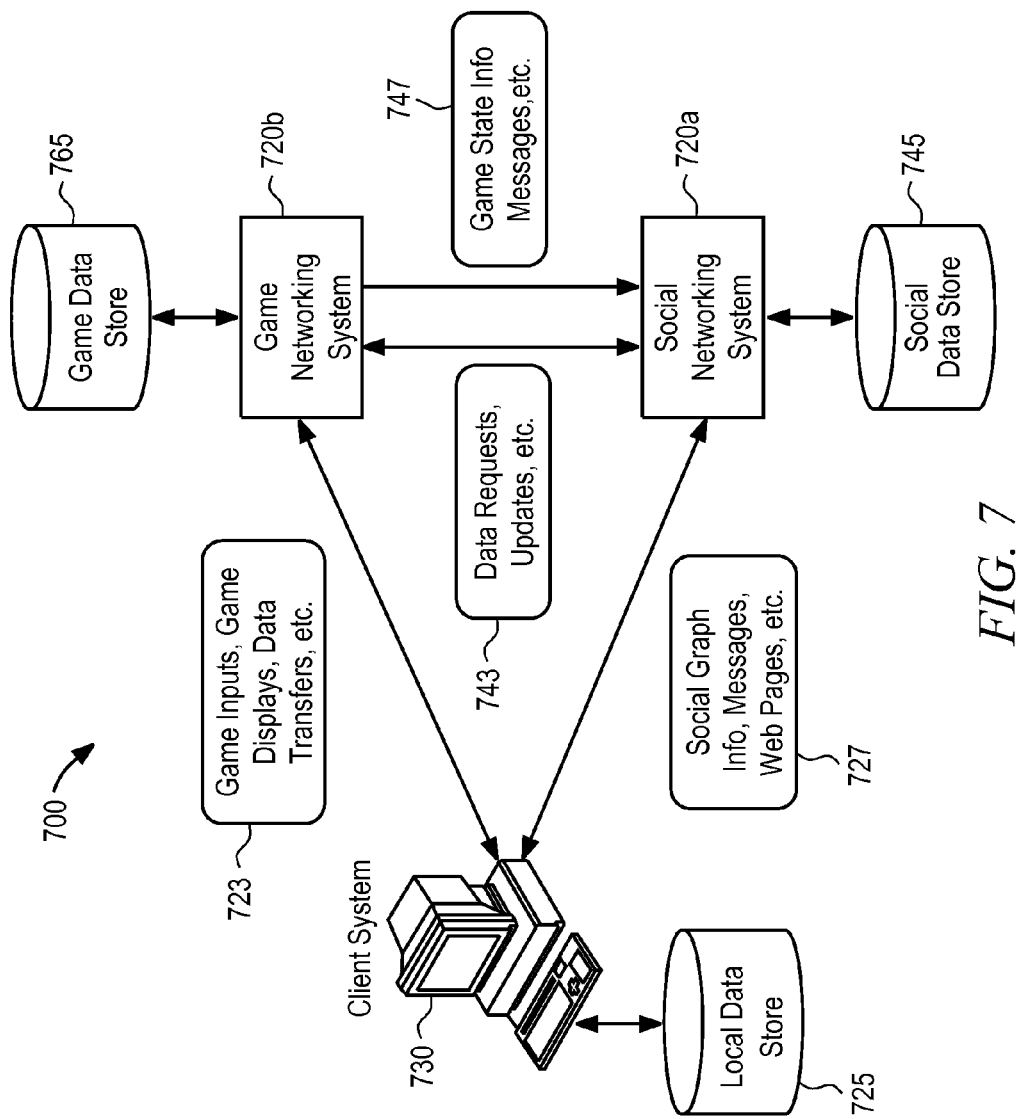
FIG. 7 is a diagrammatic representation of an example data flow between example components of the example system of FIG. 1, according to some example embodiments.

FIG. 7 illustrates an example data flow between the components of system 700. In particular embodiments, system 700 can include client system 730, social networking system 720a, and game networking system 720b. The components of system 700 can be connected to each other in any suitable configuration, using any suitable type of connection. The components may be connected directly or over any suitable network. Client system 730, social networking system 720a, and game networking system 720b can each have one or more corresponding data stores such as local data store 725, social data store 745, and game data store 765, respectively. Social networking system 720a and game networking system 720b can also have one or more servers that can communicate with client system 730 over an appropriate network. Social networking system 720a and game networking system 720b can have, for example, one or more internet servers for communicating with client system 730 via the Internet. Similarly, social networking system 720a and game networking system 720b can have one or more mobile servers for communicating with client system 730 via a mobile network (e.g., GSM, PCS, Wi-Fi, WPAN, etc.). In some embodiments, one server may be able to communicate with client system 730 over both the Internet and a mobile network. In other embodiments, separate servers can be used.

Client system 730 can receive and transmit data 723 to and from game networking system 720*b*. This data can include, for example, webpages, messages, game inputs, game displays, HTTP packets, data requests, transaction information, updates, and other suitable data. At some other time, or at the same time, game networking system 720*b* can communicate data 743, 747 (e.g., game state information, game system account information, page info, messages, data requests, updates, etc.) with other networking systems, such as social networking system 720*a* (e.g., Facebook, Myspace, etc.). Client system 730 can also receive and transmit data 727 to and from social networking system 720*a*. This data can include, for example, webpages, messages, social graph information, social network displays, HTTP packets, data requests, transaction information, updates, and other suitable data.

Communication between client system 730, social networking system 720*a*, and game networking system 720*b* can occur over any appropriate electronic communication medium or network using any suitable communications protocols. For example, client system 730, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 720*b*, the BLOB containing the game state for the instance corresponding to the player can be transmitted to client system 730 for use by a client-side executed object to process. In particular embodiments, the client-side executable may be a FLASH-based game, which can de-serialize the game state data in the BLOB. As a player plays the game, the game logic implemented at client system 730 maintains and modifies the various game state parameters locally. The client-side game logic may also batch game events, such as mouse clicks, and transmit these events to game networking system 720*b*. Game networking system 720*b* may itself operate by retrieving a copy of the BLOB from a database or an intermediate memory cache (memcache) layer. Game networking system 720*b* can also de-serialize the BLOB to resolve the game state parameters and execute its own game logic based on the events in the batch file of events transmitted by the client to synchronize the game state on the server side. Game networking system 720*b* may then re-serialize the game state, now modified, into a BLOB and pass this to a memory cache layer for lazy updates to a persistent database.

With a client-server environment in which the online games may run, one server system, such as game networking system 720*b*, may support multiple client systems 730. At any given time, there may be multiple players at multiple client systems 730 all playing the same online game. In practice, the number of players playing the same game at the same time may be very large. As the game progresses with each player, multiple players may provide different inputs to the online game at their respective client systems 730, and multiple client systems 730 may transmit multiple player inputs and/or game events to game networking system 720*b* for further processing. In addition, multiple client systems 730 may transmit other types of application data to game networking system 720*b*.

In particular embodiments, a computed-implemented game may be a text-based or turn-based game implemented as a series of web pages that are generated after a player selects one or more actions to perform. The web pages may be displayed in a browser client executed on client system 730. As an example and not by way of limitation, a client application downloaded to client system 730 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 720*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 730, either caused by an action of a game player or by the game logic itself, client system 730 may need to inform game networking system 720*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 700 is discussed in reference to updating a multi-player online game hosted on a network-addressable system (such as, for example, social networking system 720a or game networking system 720b), where an instance of the online game is executed remotely on a client system 730, which then transmits application event data to the hosting system such that the remote game server synchronizes game state associated with the instance executed by the client system 730.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 730 may include a Flash client. The Flash client may be configured to receive and run Flash application or game object code from any suitable networking system (such as, for example, social networking system 720a or game networking system 720b). In particular embodiments, the Flash client may be run in a browser client executed on client system 730. A player can interact with Flash objects using client system 730 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 730, the Flash client may send the events that caused the game state changes to the in-game object to game networking system 720b. However, to expedite the processing and hence the speed of the overall gaming experience, the Flash client may collect a batch of some number of events or updates into a batch file. The number of events or updates may be determined by the Flash client dynamically or determined by game networking system 720b based on server loads or other factors. For example, client system 730 may send a batch file to game networking system 720b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 730.

In particular embodiments, the batch file may be a text file and the name-value pairs may be in string format.

In particular embodiments, when a player plays an online game on client system 730, game networking system 720b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 720b may retrieve the corresponding BLOB from the database to determine the most-recent values of the game-related data. In particular embodiments, while a player is playing the online game, game networking system 720b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 8:
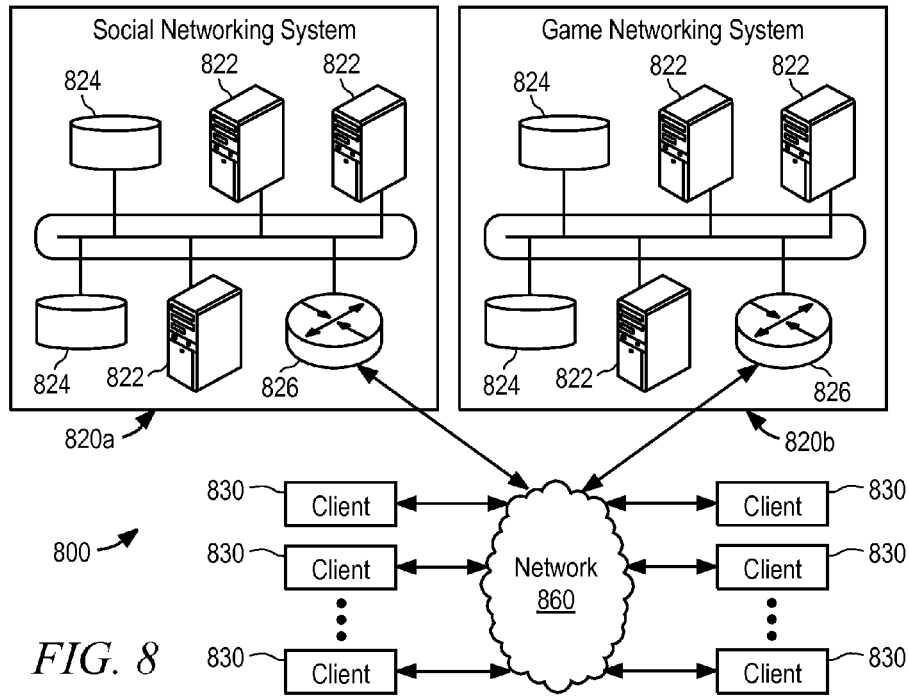
FIGS. 8-9 are schematic diagrams showing an example network environment, in which various example embodiments may operate, according to some example embodiments.

Particular embodiments may operate in a wide area network environment, such as the Internet, including multiple network addressable systems. FIG. 8 illustrates an example network environment, in which various example embodiments may operate. Network cloud 860 generally represents one or more interconnected networks, over which the systems and hosts described herein can communicate. Network cloud 860 may include packet-based wide area networks (such as the Internet), private networks, wireless networks, satellite networks, cellular networks, paging networks, and the like. As FIG. 8 illustrates, particular embodiments may operate in a network environment comprising one or more networking systems, such as social networking system 820a, game networking system 820b, and one or more client systems 830. The components of social networking system 820a and game networking system 820b operate analogously; as such, hereinafter they may be referred to simply at networking system 820. Client systems 830 are operably connected to the network environment via a network service provider, a wireless carrier, or any other suitable means.

Networking system 820 is a network addressable system that, in various example embodiments, comprises one or more physical servers 822 and data stores 824. The one or more physical servers 822 are operably connected to computer network 860 via, by way of example, a set of routers and/or networking switches 826. In an example embodiment, the functionality hosted by the one or more physical servers 822 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 822 may host functionality directed to the operations of networking system 820. Hereinafter servers 822 may be referred to as server 822, although server 822 may include numerous servers hosting, for example, networking system 820, as well as other content distribution servers, data stores, and databases. Data store 824 may store content and data relating to, and enabling, operation of networking system 820 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 824 corresponds to one or more of a variety of separate and integrated databases, such as relational databases and object-oriented databases, that maintain information as an integrated collection of logically related records or files stored on one or more physical systems. Structurally, data store 824 may generally include one or more of a large class of data storage and management systems. In particular embodiments, data store 824 may be implemented by any suitable physical system(s) including components, such as one or more database servers, mass storage media, media library systems, storage area networks, data storage clouds, and the like. In one example embodiment, data store 824 includes one or more servers, databases (e.g., MySQL), and/or data warehouses. Data store 824 may include data associated with different networking system 820 users and/or client systems 830.

Client system 830 is generally a computer or computing device including functionality for communicating (e.g., remotely) over a computer network. Client system 830 may be a desktop computer, laptop computer, personal digital assistant (PDA), in- or out-of-car navigation system, smart phone or other cellular or mobile phone, or mobile gaming device, among other suitable computing devices. Client system 830 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 830 to enter addresses of specific network resources to be retrieved, such as resources hosted by networking system 820. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 830 desires to view a particular webpage (hereinafter also referred to as target structured document) hosted by networking system 820, the user's web browser, or other document rendering engine or suitable client application, formulates and transmits a request to networking system 820. The request generally includes a URL or other document identifier as well as metadata or other information. By way of example, the request may include information identifying the user, such as a user ID, as well as information identifying or characterizing the web browser or operating system running on the user's client computing device 830. The request may also include location information identifying a geographic location of the user's client system or a logical network location of the user's client system. The request may also include a timestamp identifying when the request was transmitted.

Although the example network environment described above and illustrated in FIG. 8 described with respect to social networking system 820a and game networking system 820b, this disclosure encompasses any suitable network environment using any suitable systems. As an example and not by way of limitation, the network environment may include online media systems, online reviewing systems, online search engines, online advertising systems, or any combination of two or more such systems.

Figure 9:
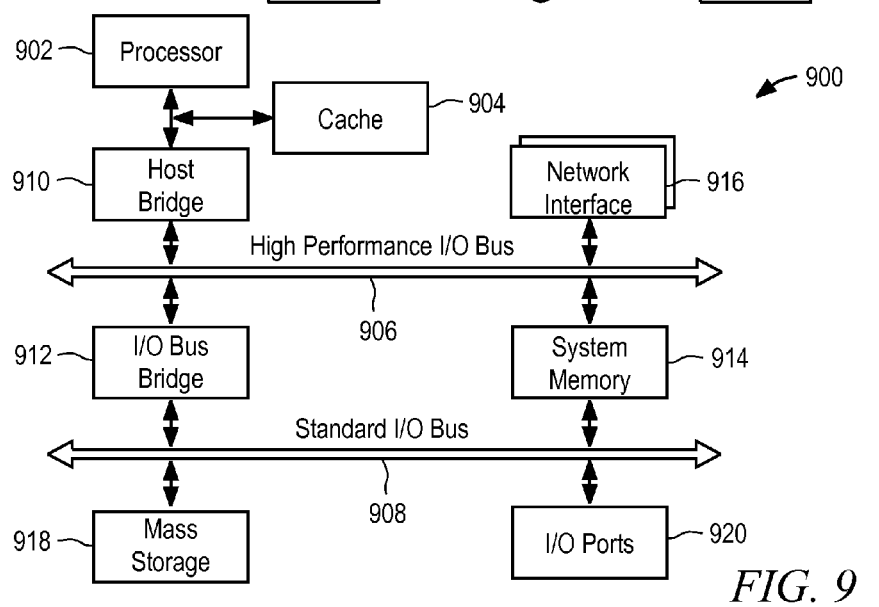

FIG. 9 illustrates an example computing system architecture, which may be used to implement a server 822 or a client system 830. In one embodiment, hardware system 900 comprises a processor 902, a cache memory 904, and one or more executable modules and drivers, stored on a tangible computer readable medium, directed to the functions described herein. Additionally, hardware system 900 may include a high performance input/output (I/O) bus 906 and a standard I/O bus 908. A host bridge 910 may couple processor 902 to high performance I/O bus 906, whereas I/O bus bridge 912 couples the two buses 906 and 908 to each other. A system memory 914 and one or more network/communication interfaces 916 may couple to bus 906. Hardware system 900 may further include video memory (not shown) and a display device coupled to the video memory. Mass storage 918 and I/O ports 920 may couple to bus 908. Hardware system 900 may optionally include a keyboard, a pointing device, and a display device (not shown) coupled to bus 908. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 900 are described in greater detail below. In particular, network interface 916 provides communication between hardware system 900 and any of a wide range of networks, such as an Ethernet (e.g., IEEE 802.3) network, a backplane, etc. Mass storage 918 provides permanent storage for the data and programming instructions to perform the above-described functions implemented in servers 422, whereas system memory 914 (e.g., DRAM) provides temporary storage for the data and programming instructions when executed by processor 902. I/O ports 920 are one or more serial and/or parallel communication ports that provide communication between additional peripheral devices, which may be coupled to hardware system 900.

Hardware system 900 may include a variety of system architectures and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain embodiments of the present disclosure may not require nor include all of the above components. For example, the peripheral devices shown coupled to standard I/O bus 908 may couple to high performance I/O bus 906. In addition, in some embodiments, only a single bus may exist, with the components of hardware system 900 being coupled to the single bus. Furthermore, hardware system 900 may include additional components, such as additional processors, storage devices, or memories.

An operating system manages and controls the operation of hardware system 900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

MISCELLANEOUS

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
   detecting a type of physical movement of a client device during gameplay of a multiplayer game that includes a virtual environment displaying a plurality of virtual objects;
   determining client device sensor data representing the type of physical movement satisfies at least one criteria in a user interaction profile, the at least one criteria mapped to a predefined physical interaction associated with a kinetic disaster simulator;
   selecting, using one or more processors, the kinetic disaster simulator based on the client device sensor data satisfying the at least one criteria;
   causing performance of a predefined game action by the kinetic disaster simulator, at a first severity level throughout the virtual environment, the performance of the predefined game action at the first severity level causing a change to each of the plurality of virtual objects of the virtual environment;
   determining a second severity level of the predefined game action associated with the kinetic disaster simulator, the second severity level based at least on an amount of time that has lapsed since selecting the kinetic disaster simulator, the second severity level being lower in severity than the first severity level; and
   causing a subsequent performance of the predefined game action according to the second severity level by the kinetic disaster simulator, throughout the virtual environment, the subsequent performance of the predefined game action causing a subsequent change to each of the plurality of virtual objects of the virtual environment.

2. The method of claim 1, wherein the type of physical movement of the client device includes:
receiving a portion of client device sensor data comprising physical interaction data pertaining to the type of physical movement.

3. The method of claim 2, wherein selecting the kinetic disaster simulator further includes selecting the kinetic disaster simulator corresponding to the type of physical movement satisfying the at least one criteria.

4. The method of claim 1, wherein the detecting of a type of physical movement of a client device comprises:
generating the client device sensor data via one or more client device sensors.

5. The method of claim 1, wherein determining client device sensor data representing the type of physical movement satisfies at least one criteria comprises:
determining a degree of the type of physical movement of the client device.

6. The method of claim 5, wherein the first severity level is based on the degree of the type of physical movement of the client device.

7. A computer system comprising:
a processor;
a memory device holding an instruction set executable on the processor to cause the computer system to perform operations comprising:
detecting a type of physical movement of a client device during gameplay of a multiplayer game that includes a virtual environment displaying a plurality of virtual objects;
determining client device sensor data representing the type of physical movement satisfies at least one criteria in a user interaction profile, the at least one criteria mapped to a predefined physical interaction associated with a kinetic disaster simulator;
selecting the kinetic disaster simulator based on the client device sensor data satisfying the at least one criteria;
causing performance of a predefined game action by the kinetic disaster simulator, at a first severity level throughout the virtual environment, the performance of the predefined game action at the first severity level causing a change to each of the plurality of virtual objects of the virtual environment;
determining a second severity level of the predefined game action associated with the kinetic disaster simulator; the second severity level based at least on an amount of time that has lapsed since selecting the kinetic disaster simulator, the second severity level being lower in severity than the first severity level; and
causing a subsequent performance of the predefined game action according to the second severity level by the kinetic disaster simulator, throughout the virtual environment, the subsequent performance of the predefined game action causing a subsequent change to each of the plurality of virtual objects of the virtual environment.

8. The computer system of claim 7, wherein the type of physical movement of the client device includes:
receiving a portion of client device sensor data comprising physical interaction data pertaining to the type of physical movement.

9. The computer system of claim 8, wherein selecting the kinetic disaster simulator further includes:
selecting the kinetic disaster simulator corresponding to the type of physical movement satisfying the at least one criteria.

10. The computer system of claim 7, wherein the detecting of a type of physical movement of a client device comprises:
generating the client device sensor data via one or more client device sensors.

11. The computer system of claim 7, wherein determining client device sensor data representing the type of physical movement satisfies at least one criteria comprises:
determining a degree of the type of physical movement of the client device.

12. The computer system of claim 11, wherein the first severity level is based on the degree of the type of physical movement of the client device.

13. A non-transitory machine-readable medium storing instructions that, when executed by one or more processors of a machine, cause the machine to perform operations comprising:
detecting a type of physical movement of a client device during gameplay of a multiplayer game that includes a virtual environment displaying a plurality of virtual objects;
determining client device sensor data representing the type of physical movement satisfies at least one criteria in a user interaction profile, the at least one criteria mapped to a predefined physical interaction associated with a kinetic disaster simulator;
selecting the kinetic disaster simulator based on the client device sensor data satisfying the at least one criteria;
causing performance of a predefined game action by the kinetic disaster simulator, at a first severity level throughout the virtual environment, the performance of the predefined game action at the first severity level causing a change to each of the plurality of virtual objects of the virtual environment;
determining a second severity level of the predefined game action associated with the kinetic disaster simulator; the second severity level based at least on an amount of time that has lapsed since selecting the kinetic disaster simulator, the second severity level being lower in severity than the first severity level; and
causing a subsequent performance of the predefined game action according to the second severity level by the kinetic disaster simulator, throughout the virtual environment, the subsequent performance of the predefined game action causing a subsequent change to each of the plurality of virtual objects of the virtual environment.

* * * * *

UNITED STATES PATENT AND TRADEMARK OFFICE
CERTIFICATE OF CORRECTION

PATENT NO. : 10,004,980 B2  
APPLICATION NO. : 14/674684  
DATED : June 26, 2018  
INVENTOR(S) : Perry et al.

Page 1 of 1

It is certified that error appears in the above-identified patent and that said Letters Patent is hereby corrected as shown below:

In the Drawings

Sheet 1 of 8, Fig. 1, reference numeral 120A, delete "120A" and insert --120a-- therefor Sheet 1 of 8, Fig. 1, reference numeral 120B, delete "120B" and insert --120b-- therefor Sheet 3 of 8, Fig. 3, reference numeral 120B, delete "120B" and insert --120b-- therefor In the Specification In Column 2, Line 53, delete "120" and insert --120a-- therefor In Column 19, Line 4, delete "422," and insert --822,-- therefor In the Claims In Column 22, Lines 46-47, in Claim 13, delete "simulator;" and insert --simulator,-- therefor Signed and Sealed this  
Twenty-first Day of April, 2020

Andrei Iancu  
*Director of the United States Patent and Trademark Office*